(12) United States Patent
Delst et al.

(10) Patent No.: US 10,618,340 B2
(45) Date of Patent: Apr. 14, 2020

(54) SECURITY FEATURE BASED ON A SINGLE AXIS ALIGNMENT OF MIRRORS IN A STRUCTURED SURFACE THAT FORMS A MICRO MIRROR ARRAY

(71) Applicant: VIAVI SOLUTIONS INC., Milpitas, CA (US)

(72) Inventors: Cornelis Jan Delst, Fairfax, CA (US); Vladmir P. Raksha, Santa Rosa, CA (US); Paul G. Coombs, Santa Rosa, CA (US); Robert B. Sargent, Santa Rosa, CA (US); Michael Ray Nofi, Rohnert Park, CA (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

(21) Appl. No.: 15/981,566

(22) Filed: May 16, 2018

(65) Prior Publication Data
US 2019/0351693 A1    Nov. 21, 2019

(51) Int. Cl.
| | |
|---|---|
| *B42D 25/369* | (2014.01) |
| *G02B 5/09* | (2006.01) |
| *B42D 25/378* | (2014.01) |
| *B42D 25/373* | (2014.01) |
| *B42D 25/425* | (2014.01) |
| *B42D 25/29* | (2014.01) |

(52) U.S. Cl.
CPC ......... *B42D 25/369* (2014.10); *B42D 25/373* (2014.10); *B42D 25/378* (2014.10); *B42D 25/425* (2014.10); *G02B 5/09* (2013.01); *B42D 25/29* (2014.10)

(58) Field of Classification Search
CPC .... B42D 25/29; B42D 25/328; B42D 25/333; B42D 25/369; B42D 25/373; B42D 25/378; B42D 25/425; G02B 5/09; G02B 5/18; G02B 5/0252; G02B 5/026; G02B 5/0284; G02B 5/0289
See application file for complete search history.

(56) References Cited

U.S. PATENT DOCUMENTS

| | | | |
|---|---|---|---|
| 2005/0173048 A1* | 8/2005 | Alasaarela | B29D 11/00 156/227 |
| 2011/0007374 A1* | 1/2011 | Heim | G03H 1/0244 359/2 |
| 2013/0093172 A1* | 4/2013 | Fuhse | B42D 15/00 283/67 |

(Continued)

*Primary Examiner* — Sultan Chowdhury
(74) *Attorney, Agent, or Firm* — Harrity & Harrity, LLP

(57) ABSTRACT

The disclosure relates to an optical security feature that is based on a single axis alignment of mirrors or facets in a structured surface that forms a micro mirror array. In an aspect, a device is described that includes a reflecting structure on a first layer, where the reflecting structure has a top surface with multiple embossed facets arranged in a spatial orientation that produces a flat ring optical effect upon incidence of light. In another aspect, a method for making the device is described that provides a reflecting layer and produces the reflecting structure on the reflecting layer with multiple facets arranged in the spatial orientation to produce the flat ring optical effect. In yet another aspect, an apparatus for making the device is described that includes a pressing device and a stamping device to transfer a pattern of the reflecting structure to a reflecting material.

26 Claims, 12 Drawing Sheets

(56) References Cited

U.S. PATENT DOCUMENTS

2018/0117947 A1* 5/2018 Fuhse .................. B42D 25/425
2018/0201044 A1* 7/2018 Holmes ................. B41M 3/148
2018/0252917 A1* 9/2018 Takahashi .......... G02B 27/0101

* cited by examiner

SECURITY FEATURE BASED ON A SINGLE AXIS ALIGNMENT OF MIRRORS IN A STRUCTURED SURFACE THAT FORMS A MICRO MIRROR ARRAY

BACKGROUND OF THE DISCLOSURE

Aspects of the present disclosure generally relate to a security feature that is based on a single axis alignment of mirrors in a structured surface that forms a micro mirror array, and more particularly, to the use of foil or other embossed or stamped devices to generate the security feature.

Optical effects such as depth, motion, and morphing have been used to generate security features for various applications, including bank notes and other types of valuable documents. Security features generally involve three different lines of defense against counterfeiting. A first line of defense includes overt security features such as watermarks, intaglio printing security threads, holograms, optically variable inks, and other features detectable by the naked eye. A second line of defense includes covert features such as magnetic inks, bar codes, luminescent printing, and retroflection. A third line of defense contains features detectable by forensic experts using laboratory equipment. The features in the first line of defense can be generally divided into optically invariable features and optically variable features or OVDs, the latter of which involves features displaying themselves in reply to an external stimulus applied to the bank note or the document by the observer.

One approach to generate or produce devices or articles with optically variable features is to form an array of magnetically-orientable platelets or flakes having reflective surfaces and aligned as concave or convex reflectors in a vehicle layer (e.g., dispersed in a fluid carrier) by the application of a magnetic field in a predefined spatial orientation. Once aligned and set (e.g., through ultra-violet (UV) curing), the array of flakes can produce different types of optical security features (e.g., optical effects).

A different approach to generate or produce devices or articles with optically variable features is to form on a foil or similar material a structured surface with an array of embossed segments or facets having reflective surfaces. The reflective facets may be referred to as micro mirrors and the overall array as a micro mirror array. The predefined alignment and orientation of the facets in the array can produce different types of optical security features as well.

In many scenarios, a Fresnel equivalent-shaped reflective structure made using the embossed foil approach can produce the same or similar optical effect to a counterpart reflective structure made of magnetically aligned flakes. There are scenarios, however, in which the optical effects or features produced by magnetically aligned flakes may not be easily reproduced by the embossed or stamped foil approach, limiting the ability of those that have implemented the embossed foil approach into their first line of defense from introducing more advanced and secure optical features that may be implemented using magnetically aligned flakes.

Accordingly, mechanisms or techniques are desirable that allow for some optical effects to be implemented as optically variable security features when using the embossed or stamped foil approach.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

Mechanisms or techniques are generally described that enable a security feature (e.g., flat ring feature or flat ring optical effect) that is based on a single axis alignment of mirrors in a structured surface that forms a micro mirror array. The micro mirror array may be formed by embossing or stamping a foil to produce multiple reflecting facets (e.g., micro mirrors) on the surface of the foil. The facets are arranged in a certain spatial orientation to generate the security feature. The spatial orientation may be such that each facet is aligned or ordered along a first axis and is randomly (e.g., pseudo-random) positioned relative to a second axis perpendicular to the first axis. While this single axis alignment may occur naturally in arrays of magnetically aligned flakes, such single axis alignment, and the random alignment, orientation, or ordering that needs to occur in the other axis, have to be explicitly implemented as part of the design of the structured surface of the embossed foil.

In an aspect of the disclosure, an example of an optically variable device is described that includes a first layer; and a reflecting structure disposed on the first layer, where the reflecting structure has a top surface including multiple embossed facets, and where the facets are arranged in a spatial orientation that produces a flat ring feature or optical effect upon incidence of light.

In another aspect of the disclosure, an example of a method for making an optically variable device is described that includes providing a reflecting layer; and producing a reflecting structure on the reflecting layer having multiple facets, the facets being arranged in a spatial orientation that produces a flat ring feature or optical effect upon incidence of light.

In yet another aspect of the disclosure, an example of an apparatus for making an optically variable device is described that includes a pressing device, and a stamping device coupled to the pressing device and configured to transfer a pattern to a reflecting material upon the exertion of pressure by the pressing device, where the pattern includes a reflecting structure having multiple facets arranged in a spatial orientation that produces a flat ring feature or optical effect upon incidence of light on the patterned reflective material.

BRIEF DESCRIPTION OF THE DRAWINGS

The appended drawings illustrate only some implementation and are therefore not to be considered limiting of scope.

DETAILED DESCRIPTION

Figure 1:
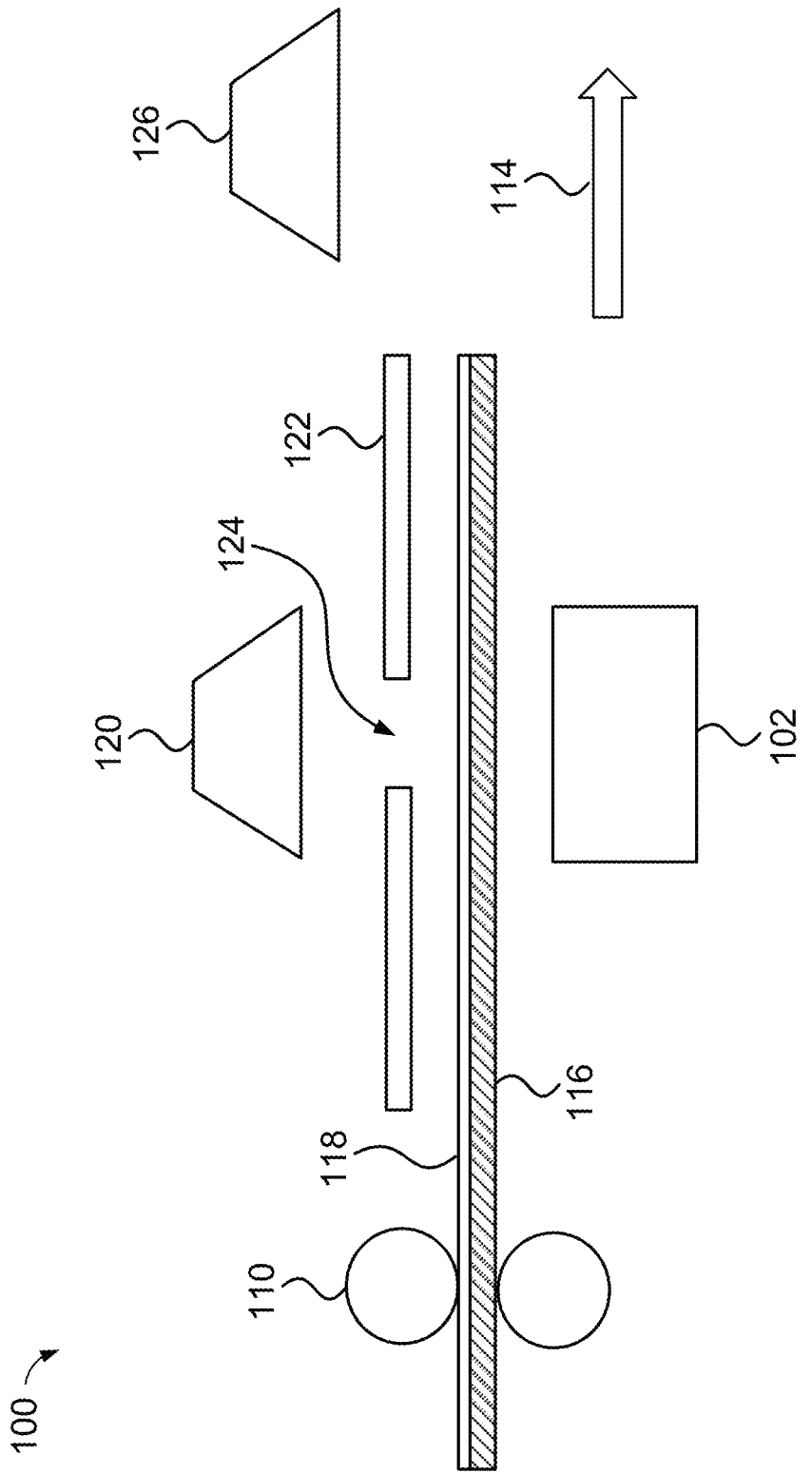
FIG. 1 is a schematic diagram that shows an example of an apparatus for orienting magnetic flakes to generate a structure that produces an optical effect in accordance with aspects of this disclosure.

The detailed description set forth below in connection with the appended drawings is intended as a description of various configurations or implementations, and is not intended to represent the only configurations or implementations in which the concepts described herein may be practiced. The detailed description includes specific details or aspects for the purpose of providing a thorough understanding of various concepts. However, it will be apparent to those skilled in the art that these concepts may be practiced without these specific details.

As used in this disclosure, the terms "a" and "an" are intended to denote at least one of a particular element, the terms "include" and "including" are intended to mean includes and including, respectively, but not limited to, and the term "based on" is intended to mean based at least in part on. Also as used in this disclosure, the terms "substantially," "approximately," and about indicate a range of values within and including ±5% of the stated value (e.g., ±1%, ±2%, ±3%, ±4%, ±5%).

As described above, the disclosure provides mechanisms or techniques that enable a security feature (e.g., flat ring feature or flat ring optical effect) that is based on a single axis alignment of mirrors in a structured surface that forms a micro mirror array. The micro mirror array may be formed by embossing or stamping a foil to produce multiple reflecting facets (e.g., multiple small or micro mirrors) on the surface of the foil. The facets are arranged in a certain spatial orientation to generate the security feature. The spatial orientation may be such that each facet is aligned or ordered along a first axis and is randomly (e.g., pseudo-randomly) positioned relative to a second axis perpendicular to the first axis. While this single axis alignment may occur naturally in arrays of magnetically aligned flakes, such single (i.e., first) axis alignment, and the random alignment, orientation, or ordering that needs to occur in the second axis, have to be explicitly implemented as part of the design of the structured surface of the embossed foil. That is, in the design or implementation of the structured surface, a certain amount of tilting or rotating about the second axis has to be introduced for each of the facets, where the amount of tilting or rotating for each facet is randomly or pseudo-randomly selected. As such, the amount of tilting or rotating that is introduced can result in a series of adjacent facets having different rotations about the second axis, where some are rotated clockwise, some counterclockwise, some rotated by a large angle, and some rotated by a small amount or not rotated at all.

It is to be understood that the components, parts, or systems shown in FIGS. 1-6E, 8A, and 8B to describe various aspects of the articles, devices, apparatuses, and/or mechanisms proposed in this disclosure are not intended to be drawn to scale and, in some instances, may instead be drawn in such a way as to exaggerate certain physical characteristics or attributes for illustrative purposes.

FIG. 1 shows an apparatus 100 for orienting magnetically-orientable flakes. The apparatus 100 may include a magnet 102. The magnet 102 may be, for example, a funnel-shaped magnet as described below in connection with FIG. 2A that affects an alignment/orientation of the flakes to produce a flat ring feature or optical effect when the flakes are illuminated. The magnet 102 may have opposite poles to apply a magnetic field having magnetic field lines emanating from the magnet 102. Magnetic vector forces, which may also be termed "magnetic induction," may be defined as forces that may be applied by the magnetic field in various directions that emanate from the magnet 102.

The apparatus 100 is also shown to include a feeding mechanism 110 in the form of a pair of rollers arranged to feed a substrate 116 in a feed direction 114. Although the substrate 116 has been depicted as being directly fed by the rollers, the substrate 116 may instead be supported on a support (not shown). Other kinds of feeding mechanisms are possible. The support, if employed, may be a belt, a platform, one or more rows of grippers, a frame, or the like, and may support the substrate 116 such that the substrate 116 may be moved in the feed direction 114 along with the support as the rollers of the feeding mechanism 110 are rotated. The apparatus 100 may include additional feeding mechanisms (not shown) provided upstream and/or downstream of the feeding mechanism 110.

The substrate 116 may be formed of paper, plastic film, laminate, card stock, or the like. In a particular example, the substrate 116 may be a bank note or other important document (or may be a film or layer that is subsequently attached to a bank note or other important document). In addition, at least a portion of an upper surface of the substrate 116 may be coated with a fluid carrier 118 in which magnetically-orientable particles or flakes are dispersed. The substrate 116 may be referred to as a first or bottom layer and the fluid carrier 118 may be referred to as a second, top, or vehicle layer. The fluid carrier 118 may also be termed an ink, a wet ink, a coating, a fluid coating, or the like. The fluid carrier 118 may be applied through a printing technique such as gravure, ink-jet printing, flexographic, Intaglio, silk screen printing, painting, etc. The fluid carrier 118 may be in the form of ink or paint and may remain in a fluid form for at least a predetermined length of time or until a sufficient amount of energy is applied onto the fluid carrier 118. For instance, the fluid carrier 118 may be a liquid or a paste-like carrier and may be curable (e.g., may be set) through receipt of energy in the form of ultra-violet (UV) light, electron beam, heat, laser, etc. By way of particular example, the fluid carrier 118 may be a photopolymer, a solvent-based carrier, a water-based carrier, or the like. In addition, the fluid carrier 118 may be transparent, either clear, colorless, or tinted.

In one example, the fluid carrier 118 with the magnetically-orientable flakes may be applied onto the substrate 116 immediately prior to the substrate 116 being fed over the magnet 102 such that the fluid carrier 118 remains in a fluid state as is moved over the magnet 102. The magnetically-orientable flakes may be mixed into the fluid carrier 118 prior to or after the fluid carrier 118 has been applied onto the substrate 116. The magnetically-orientable flakes are non-spherical and planar flakes, that is, pigment flakes that can be aligned using a magnetic field, and may be reflective and/or may be color shifting (e.g., a flake may appear to have one color at one observation angle and another color at another observation angle). The magnetically-orientable flakes may or may not retain remnant magnetization. By way of example, a typical magnetically-orientable flake may be anywhere from about 1 to about 500 micrometers across and anywhere from about 0.1 to about 100 micrometers thick. In addition, the magnetically-orientable flakes may include a metallic layer, such as a thin film of aluminum, gold, nickel, platinum, metal alloy, etc., or may be a metal flake, such as a nickel, iron, or alloy flake. Alternatively, the magnetically-orientable flakes may be coated with a tinted layer, or may include an optical interference structure, such as an absorber-spacer-reflector Fabry-Perot type structure.

According to an example, the substrate 116 may be moved through the magnetic field of the magnet 102 before the fluid carrier 118 sets or dries to enable the magnetically-orientable flakes to become oriented in the direction of the magnetic field (e.g., vector forces). In addition, as the vector forces are not uniform across the magnet 102, the orientations of the magnetically-orientable flakes may vary depending upon the locations of the magnetically-orientable flakes with respect to the poles of the magnet 102. As such, the orientations of the magnetically-orientable flakes may change as the substrate 116 is fed through the magnetic field applied by the magnet 102.

The apparatus 100 may also include a radiation source 120 (or an array of radiation sources 120), which may apply radiation onto the fluid carrier 118 to cure or otherwise solidify the fluid carrier 118 as the substrate 116 is fed in the feed direction 114. The radiation source 120 may apply radiation in the form of ultra-violet (UV) light, electron beam, heat, laser, or the like. A mask 122 having at least one opening 124 is also shown as being positioned between the radiation source 120 and the fluid carrier 118 to control which portion or portions of the fluid carrier 118 receives radiation from the radiation source 120 as the substrate 116 passes by the radiation source 120. The at least one opening 124 is strategically positioned with respect to the magnet 102 and radiation source 126 to cause the magnetically-orientable flakes to be at least partially fixed at predetermined orientations while preventing other magnetically-orientable flakes from being at least partially fixed at other orientations.

In some examples, a second radiation source 126 may also be used to apply energy onto the fluid carrier 118 in the form of UV light, electron beam, heat, or the like. The second radiation source 126 may apply the same type of energy or a different type of energy as compared with the radiation source 120. The second radiation source 126 may be optional and may be implemented to further solidify the fluid carrier 118 and thereby set the magnetically-orientable flakes in a fixed position or configuration that provides the desired optical effect when light is incident upon the oriented flakes.

Figure 2A:
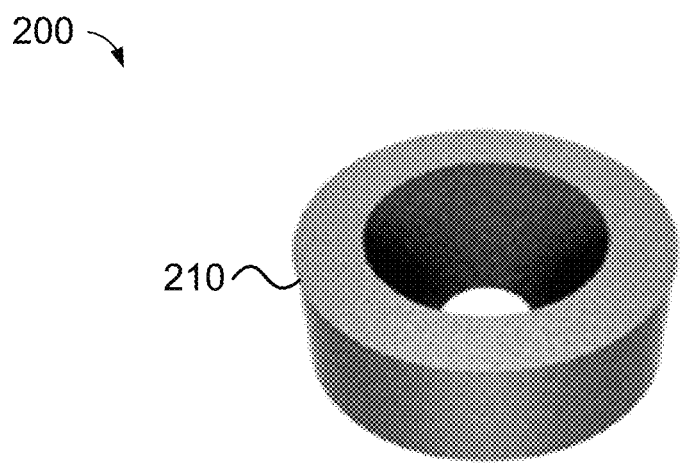
FIG. 2A is a diagram that shows a funnel-shaped magnet for orienting magnetically-orientable flakes to produce a flat ring optical effect in accordance with aspects of the disclosure.
Figure 4A:
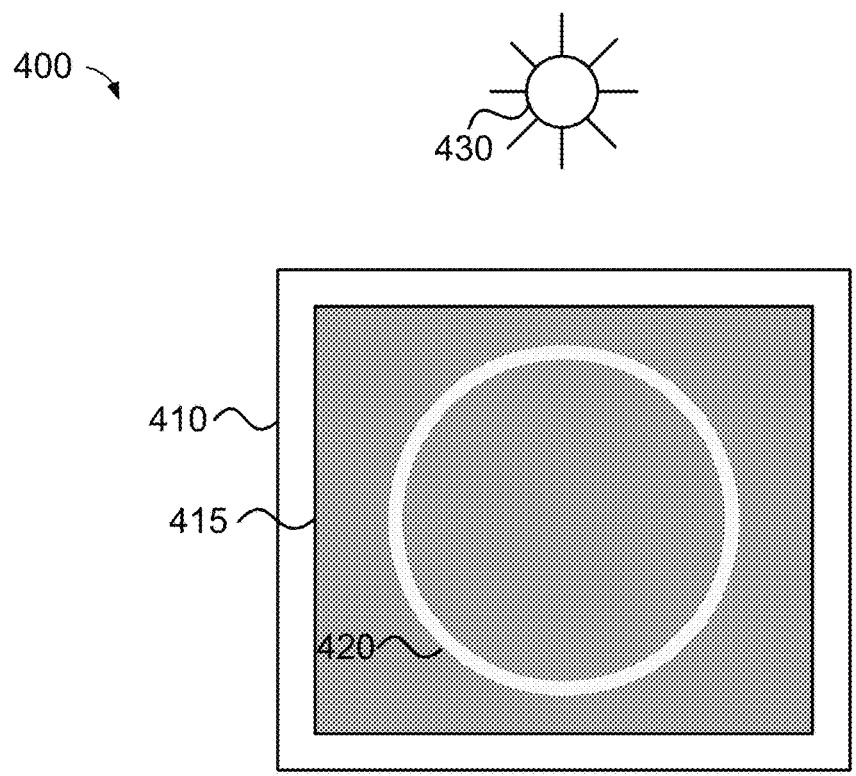
FIG. 4A is a diagram that shows an example of a flat ring optical effect from illumination by a single-point light source produced by magnetically-orientable flakes aligned using a funnel-shaped magnet in accordance with aspects of the disclosure.

One of the optically variable features that can be produced by magnetically orienting flakes using the apparatus 100 in FIG. 1 is a flat ring feature or optical effect (see e.g., FIG. 4A). In order to achieve a flat ring from a single-point light source, the flakes need to be arranged in a specific manner and a particular type of magnet may be needed to create the appropriate magnetic field (e.g., vector forces) profile or configuration such that the flakes align in a desired spatial orientation. FIG. 2A shows a diagram 200 having a funnel-shaped magnet 210 for orienting magnetically-orientable flakes to produce a flat ring optical effect. The funnel-shaped magnet 210 may correspond to the magnet 102 described above in connection with the apparatus 100 in FIG. 1. The funnel-shaped magnet 210 may be made of, for example, a compression bended neodymium boron material and may be constructed by having a disk-shaped magnet machined to produce the funnel shape. In an example, the angle of the funnel inside the magnet may vary from approximately 30° to approximately 90° (e.g., approximately 30°, 35°, 40°, 45°, 50°, 60°, or 75°). A diagram 220 is shown in FIG. 2B to illustrate a cross-sectional view 230 of the funnel-shaped magnet 210 in which the angle of the funnel inside the magnet can be more clearly seen.

In some implementations, a thin sheet metal (not shown) made from Mu-metal (e.g., nickel-iron soft ferromagnetic alloy) having a central opening may be placed over the funnel-shaped magnet 210 to bend its fields around its edges and slightly modify the magnetic field configuration (e.g., magnetic field lines or direction of vector forces).

Other types of magnets may also be used instead of the funnel-shaped magnet 210. For example, two concentric magnets (with one inside the other) may also be used to orient magnetically-orientable flakes to produce a similar optical effect as the funnel-shaped magnet 210. Moreover, variations of the funnel-shaped magnet 210 may be used, including magnets with square, pentagonal, hexagonal, elliptical, and triangular funnels. The optical effects produced from using these variations of the funnel-shaped magnet 210 may also be referred to flat ring features or flat ring optical effects, even though the actual effect may not be circular in nature.

Figure 2B:
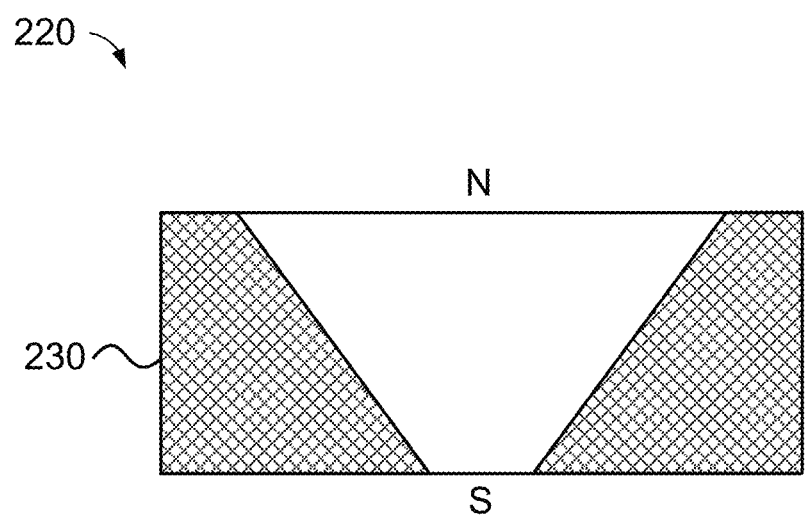
FIG. 2B is a diagram that shows an example of a cross-sectional view of a funnel-shaped magnet in accordance with aspects of the disclosure.

In an example, the funnel-shaped magnet 210 may have its poles at the top (negative pole—N) and bottom (positive pole—P) as illustrated in the diagram 220 in FIG. 2B. Other pole configurations may also be possible to use and need not be limited to the example shown in the diagram 220.

Figure 3A:
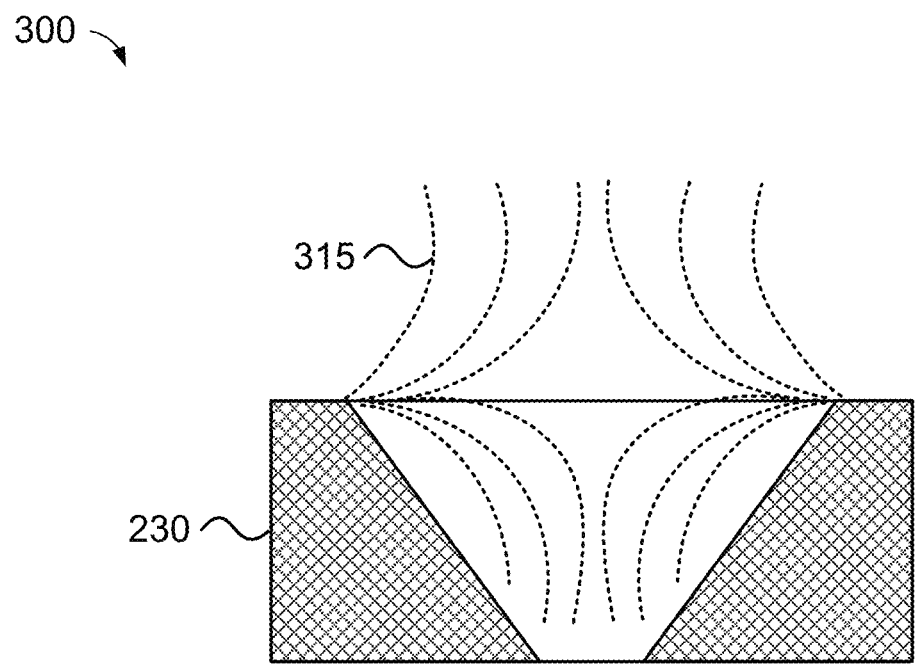
FIG. 3A is a diagram that shows an example of a magnetic field configuration produced by a funnel-shaped magnet in accordance with aspects of the disclosure.

FIG. 3A illustrates a diagram 300 that shows an example of a magnetic field configuration produced by a funnel-shaped magnet such as the funnel-shaped magnet 210 in FIG. 2A (although the cross-sectional view 230 is shown in FIG. 3A). The magnetic field can be depicted as having lines of magnetic field 315 (flux density) emanating from the poles of the magnet. In the diagram 300, the lines of magnetic field 315 are merely illustrative and are not intended to provide an accurate and complete picture of the entire magnetic field produced by the funnel-shaped magnet 210. In an aspect, the lines of magnetic field 315 may vary depending on the angle of the funnel inside the funnel-shaped magnet 210.

Figure 3B:
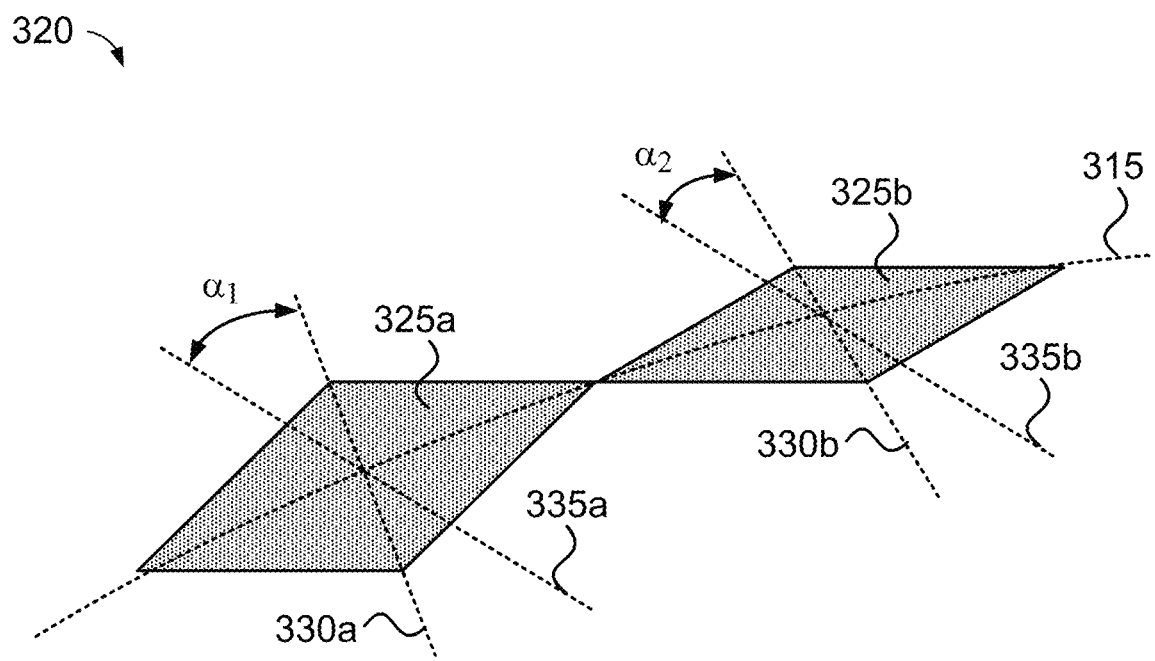
FIG. 3B is a diagram that shows a single-axis alignment of magnetically-orientable flakes under the field of a funnel-shaped magnet in accordance with aspects of the disclosure.

In general, when orienting magnetically-orientable flakes using the magnetic field produced by a magnet, the flakes tend to align themselves along the lines of magnetic field 315. FIG. 3B illustrates a diagram 320 that shows a single-axis alignment of magnetically-orientable flakes under the magnetic field of a magnet such as the funnel-shaped magnet 210 in FIG. 2A. As used within this disclosure, the terms "magnetically-orientable flakes," "flakes," and "platelets" may be used interchangeably to refer to reflective flakes before or after being oriented. The diagram 320 includes a first flake 325a and a second flake 325b. Although only two flakes are being shown in this example, it is understood that the concepts being illustrated by the flakes in the diagram 320 apply more generally to a larger group of flakes being oriented using a magnet. It is also to be understood that for any array, group, or arrangement of a large number of flakes, the flakes are likely to be uniform in both shape and size, although there may be instances in which flakes of different sizes and/or different shapes are used.

In the example in the diagram 320, the flakes 325a and 325b are assumed to generally have a shape or form with two main axes. The flake 325a aligns or orients itself with a longest or first axis along the direction of a line of magnetic field 315. Similarly, the flake 325b aligns or orients itself with a longest or first axis along the direction of a line of magnetic field 315. For the flake 325a, a second or shortest axis 330a, perpendicular to the longest axis, is also shown. Similarly, for the flake 325b, a second or shortest axis 330b, perpendicular to the longest axis, is also shown. While the flakes 325a and 325b are aligned, oriented, or ordered in the direction of the line of magnetic field 325, that is not the case perpendicularly to the line of magnetic field 315.

For the flake 325a, the second axis 330a may pivot, tilt, or rotate freely (until the flake is set by curing) and, therefore, there may be an angle $\alpha_1$ ($0 \leq \alpha_1 \leq 360°$, or $\alpha_1 \leq \pm 90°$) between the second axis 330a and a surface perpendicular to the line of magnetic field 315 (represented by line 335a) such that there is a degree of freedom in the orientation of the flake 325a in this direction.

Similarly, for the flake 325b, the second axis 330b may pivot, tilt, or rotate freely (until the flake is set by curing) and, therefore, there may be an angle $\alpha_2$ ($0 \leq \alpha_2 \leq 360°$, or $\alpha_2 \leq \pm 90°$ between the second axis 330b and a surface perpendicular to the line of magnetic field 315 (represented by line 335b) such that there is a degree of freedom in the orientation of the flake 325b in this direction.

Therefore, the flakes 325a and 325b experience a single-axis alignment along the first or longest axis and in the direction of the line of magnetic field 315. There is no such order or alignment along the second axis. Moreover, the amount of the rotation in the second axis is generally random and may occur naturally as part of the magnetic orientation process performed by the apparatus 100 given that the flakes 325a and 325b are dispersed in a fluid medium before such medium is hardened.

It is this alignment on a first axis and random rotation on a second axis for each flake (e.g., single-axis alignment), in combination with the magnetic field produced by the funnel-shaped magnet 210, that allows for an array of flakes oriented in this manner to produce the flat ring optical effect when illuminated by a light source.

FIG. 4A shows a diagram 400 with an example of a flat ring optical effect in the form of a circle 420 resulting from illumination by a light source 430. The optical effect is produced by magnetically-oriented flakes aligned using a funnel-shaped magnet such as the funnel-shaped magnet 210 in FIG. 2A. In the diagram 400, a substrate (card or base layer) 410 may include a printed or reflective layer 415. The substrate 410 may correspond to the substrate 116 in FIG. 1 and the printed layer 415 may correspond to the fluid carrier 118 in FIG. 1 after it has been cured or hardened to set the orientation of the flakes within it.

Figure 4B:
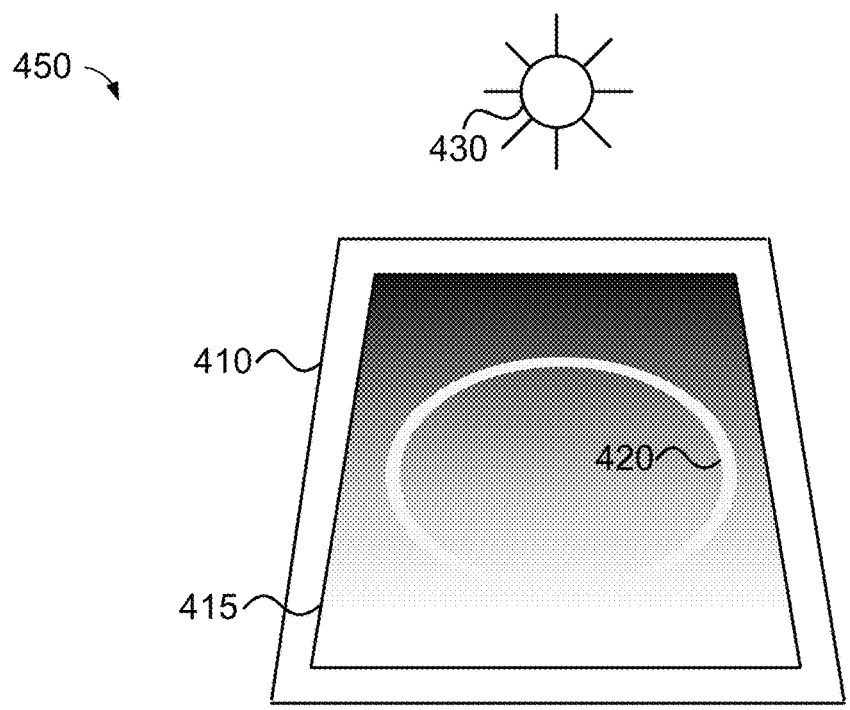
FIG. 4B is a diagram that shows an example of movement of a flat ring optical effect by tilting in accordance with aspects of the disclosure.

The substrate 410 may be tilted such that the upper portion moves away from an observer, as illustrated in a diagram 450 in FIG. 4B. As seen in the diagram 450, the lower portion of the printed layer 415 is now lighter and the circle 420 moves in the direction of the bottom of the print layer 415, exhibiting different distances between the circle 420 and the upper and lower portions of the printed layer 415. The lighter area of the printed layer 415 reflects light differently because the flakes in these areas, having the same alignment in radial regions, are aligned at different angles with respect to the observer. As a result, the printed layer 415 obtains a gradient from dark in the upper portion to light in the lower portion. The contrast difference and the shadowing depicted in FIG. 4B creates the perception of volume and depth because the human visual system considers brighter objects to be closer to an observer than darker objects. As such, the volume combined with the illusive motion of the circle 420 give the perception of flotation, that is, it appears as if the circle 420 is floating beneath a surface of the print layer 415 and above a background with gradient of color and depth.

Figure 4C:
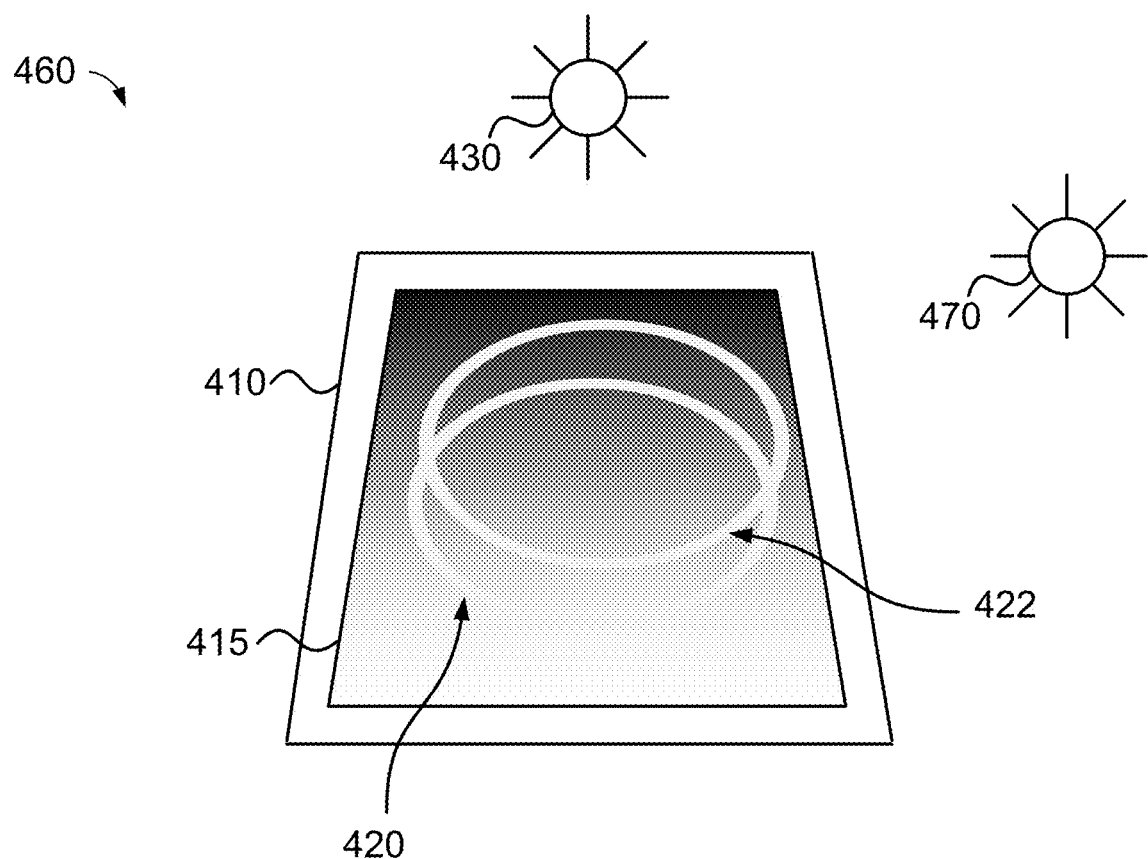
FIG. 4C is a diagram that shows an example of multiple flat ring optical effects from illumination by different light sources from different directions in accordance with aspects of the disclosure.
Figure 5:
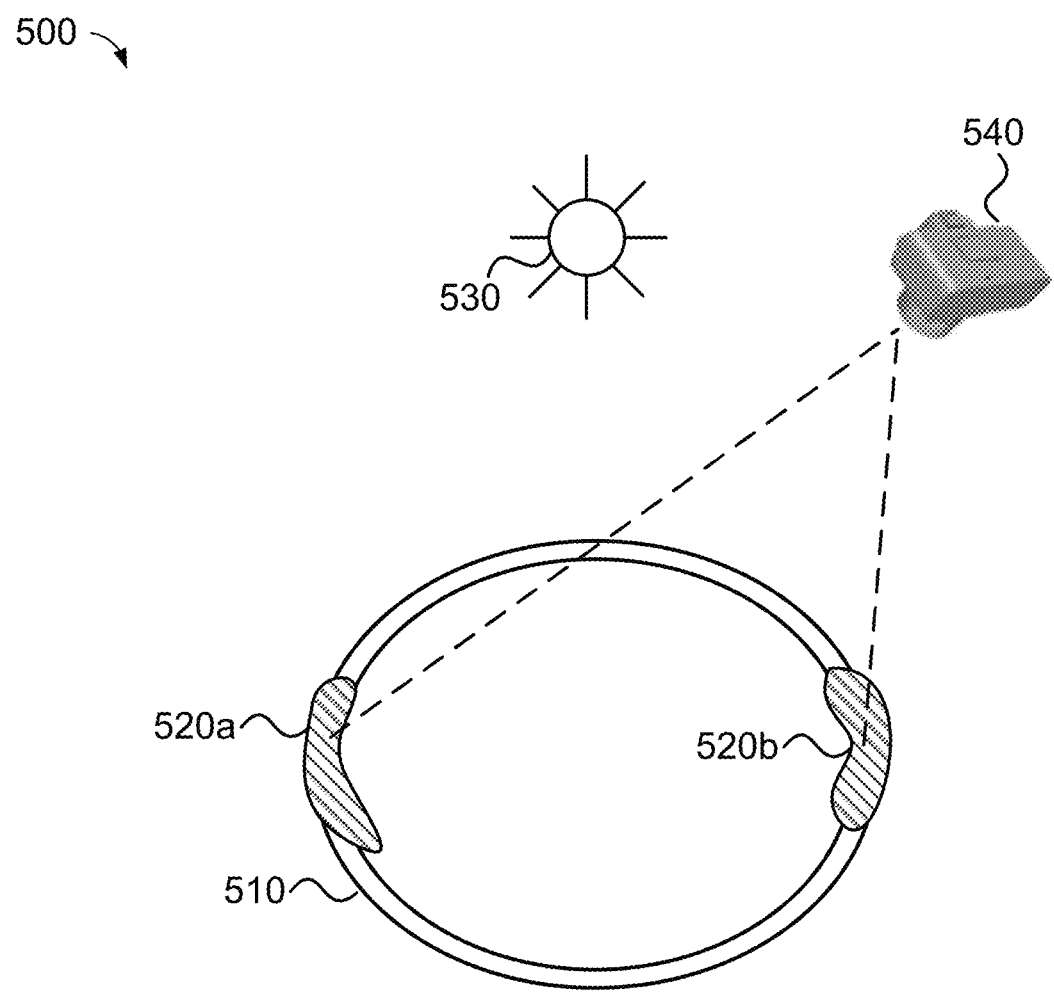
FIG. 5 is a diagram that shows an example of the optical effect produced by an embossed foil without randomness in an axis of facets in a structured surface in accordance with aspects of the disclosure.

When the substrate 410 with the print layer 415 remains tilted as in FIG. 4B but it is also illuminated with an additional light source 470 located at some distance from the light source 430 as illustrated in FIG. 4C, it creates the appearance of an additional circle 422 at some distance from the circle 420 in the direction of the light source 470. Both the circle 420 and the circle 422 may have the same color and intensity of a reflected light if the color of the flakes (e.g., a pigment of the flakes) in the print layer 415 is silver-like or all the flakes are colored in a single color. That is, if the two light sources 430 and 470 are of a same color so will be the circles 420 and 422, otherwise the circles 420 and 422 will be of different colors. The circle 420 and the circle 422 can have different colors if magnetic color-shifting interference pigments were used for the flakes in the print layer 415.

Thus, FIGS. 4A-4C describe some of the aspects associated with the flat ring optical effects that can be produced when natural alignment on a first axis and random rotation on a second axis for each flake (e.g., single-axis alignment as illustrated in FIG. 3B) occurs in combination with the magnetic field produced by the funnel-shaped magnet 210.

That is, magnetically-oriented flakes have a specific way of aligning in static magnetic fields that results in unique optical effects such as the flat ring optical effect. These optical effects, however, cannot be achieved with smooth surface reflector shapes (e.g., structured surface with an array of embossed segments or facets having reflective surfaces). In other words, when a foil, substrate, or layer having a structured surface with a micro mirror array is used instead of magnetically-oriented flakes, these same optical effects would not be visible under light illumination because reflections from a smooth surfaces such as the surfaces of the aligned mirrors in the micro mirror array are specular in all directions.

For example, when a foil, substrate, or layer has a micro mirror array (e.g., an array or arrangement of small mirror or facets) that is used to emulate the outside surface of a sphere, the mirrors are aligned in a plane parallel to the sphere surface. Such a reflector would not produce the same optical effects as described above in connection with FIGS. 4A-4C. Instead, as illustrated in a diagram 500 in FIG. 5, such a reflector would produce dots or spots 520a and 520b to an observer 540, but not a flat-circle 510, when illuminated by light source 530. In other words, an undesirable optical effect would occur instead of the desirable flat ring optical effect.

To address this problem and provide a solution that enables yet another way to produce the unique optical effects described in this disclosure, techniques are described to control the direction, orientation, or rotation of each individual mirror in a micro mirror array to emulate or even surpass the optical effects that can be achieved using magnetically-oriented flakes. As such, when using a micro mirror array to emulate the outside surface of a half sphere as described above, by aligning the mirrors or facets in a micro mirror array on an axis parallel to the sphere surface on radial lines and having a distributed or random (e.g., pseudo-random) alignment perpendicular to the radial lines, then the optical effects described herein may be possible using an embossed foil with a surface structure having the micro mirror array. This is possible at least in part because the reflection pattern from the latter alignment can emulate the reflection from a sphere with a "brushed" surface, which is vastly different than the reflection from a sphere with a "smooth" surface. The reflection from the "smooth" surface is specular in all directions, however, the reflection from the brushed surface is specular in some directions and diffuse in others.

Figure 6A:
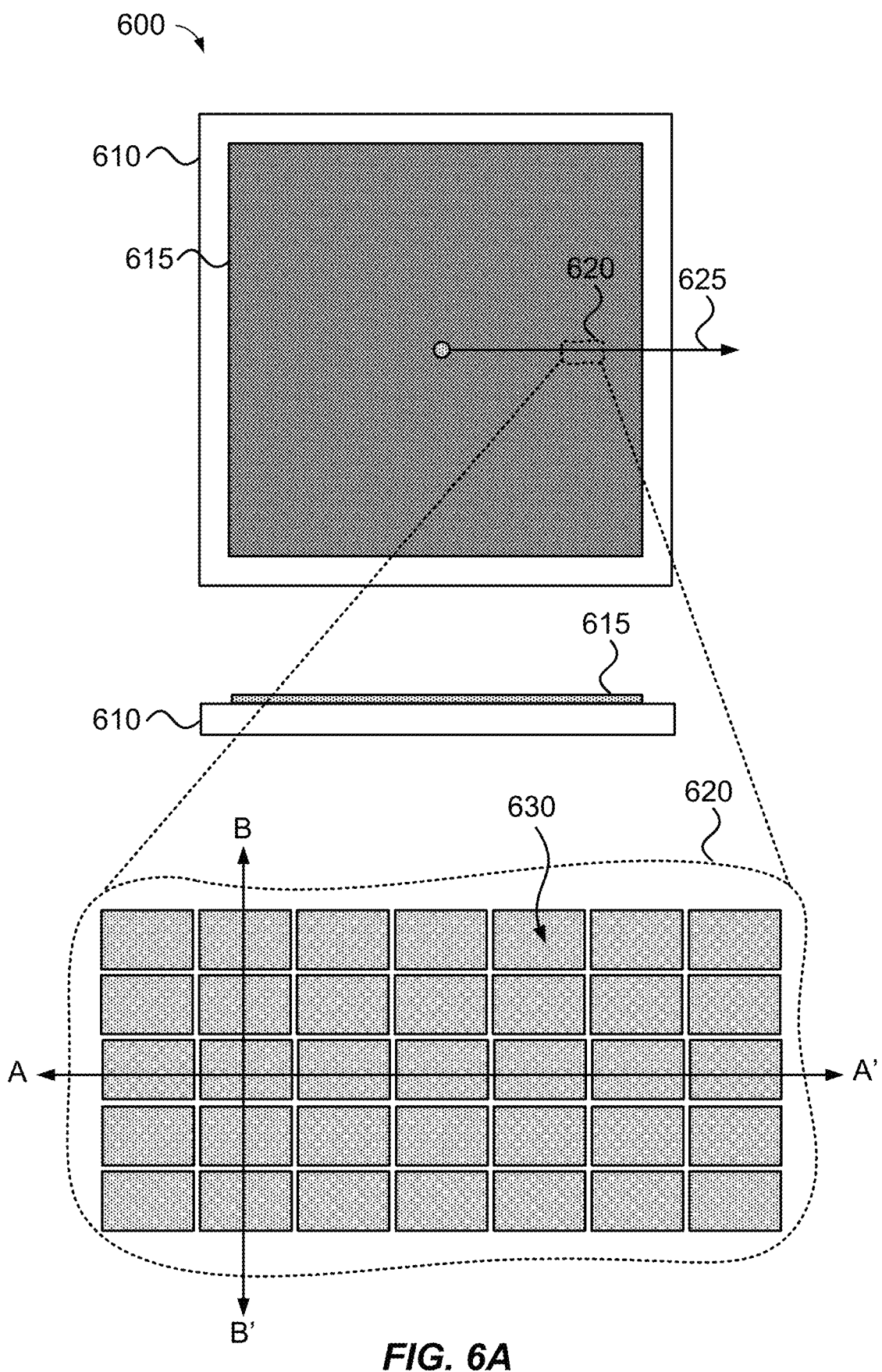
FIG. 6A is a diagram that shows an example of an optically variable device made of an embossed foil with multiple facets that produces a flat ring optical effect in accordance with aspects of the disclosure.

FIG. 6A shows an example of an optically variable device 600 that is capable of producing a flat ring optical effect as described above in connection with FIGS. 4A-4C. The optically variable device 600, which may be referred to as an optical device, a device, an article, or a reflector, may include a substrate or layer 610 and a reflecting structure 615. The reflecting structure 615 may be embossed or stamped to produce an array or arrangement of micro mirrors. As used in this disclosure, the terms "micro mirrors," "facets" and "segments" may be used interchangeably to refer to small, angled, and reflecting surface structures that collectively emulate a reflector shape and that can be produced by various techniques including embossing and stamping, for example.

FIG. 6A shows both a top view of the optically variable device 600 and a side view of the same device. The relative sizes and thicknesses of the substrate 610 and the reflecting structure 615 are provided by way of illustration and need not be considered limiting.

Also shown in FIG. 6A is a radial direction or line 625 from a center of the reflecting structure 615 and a portion 620 of the reflecting structure 615 along the radial direction 625. An expanded view of the portion 620 is shown illustrating a small part of a micro mirror array on the reflecting structure 615. Within the portion 620 there are multiple facets 630 arranged into rows and columns, for example (although other arrangements may also be used). It is to be understood that the shape and size of the facets 630 are assumed to be generally uniform throughout the reflecting structure 615. However, there may be implementations in which the shape, size, and/or arrangement of the facets 630 may change based on, for example, the location of a facet in the reflecting structure 615.

Figure 6B:
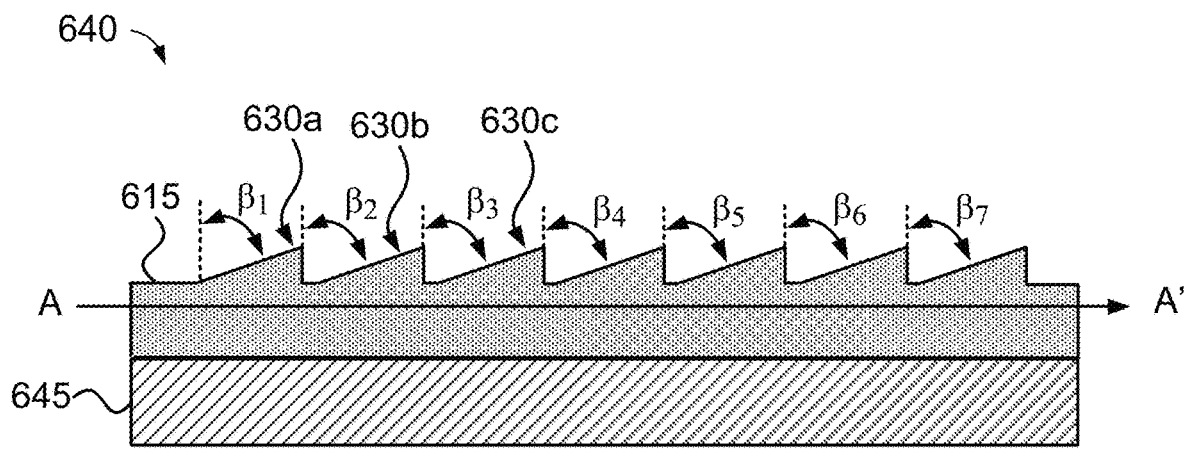
FIGS. 6B and 6C are diagrams that show an example of alignment of facets in an optically variable device along an axis in a radial direction with randomness along a perpendicular axis to produce the flat ring optical effect in accordance with aspects of the disclosure.

With respect to the portion 620, a view along A-A' parallel to the radial direction 625 is illustrated in a diagram 640 in FIG. 6B. In this example, seven (7) facets 630 are shown for purposes of illustration. The facets 630 are formed, constructed, or otherwise shaped on a top surface of the reflecting structure 615. The reflecting structure 615 may itself be part of a reflecting layer. That is, the reflecting structure 615 may simply be a reflecting layer on which the facets 630 have been formed. In one implementation, the reflecting structure 615 may be disposed on another layer 645 (optional layer), which may be made of the same or different material as the reflecting structure 615. Moreover, the layer 645 may be part of, or may be disposed or positioned on, the substrate 610, where the substrate 610 can be a bank note or another valuable document, for example.

Returning to FIG. 6B, each of the facets 630 in the diagram 640 is configured or formed to have a specified angle relative to a plane or direction perpendicular to the surface of the reflecting structure 615 as shown by angles $\beta_1$, $\beta_2$, $\beta_3$, $\beta_3$, $\beta_4$, $\beta_5$, $\beta_6$, and $\beta_7$, which may be the same or different depending on the implementation of the reflecting structure 615.

Figure 6C:
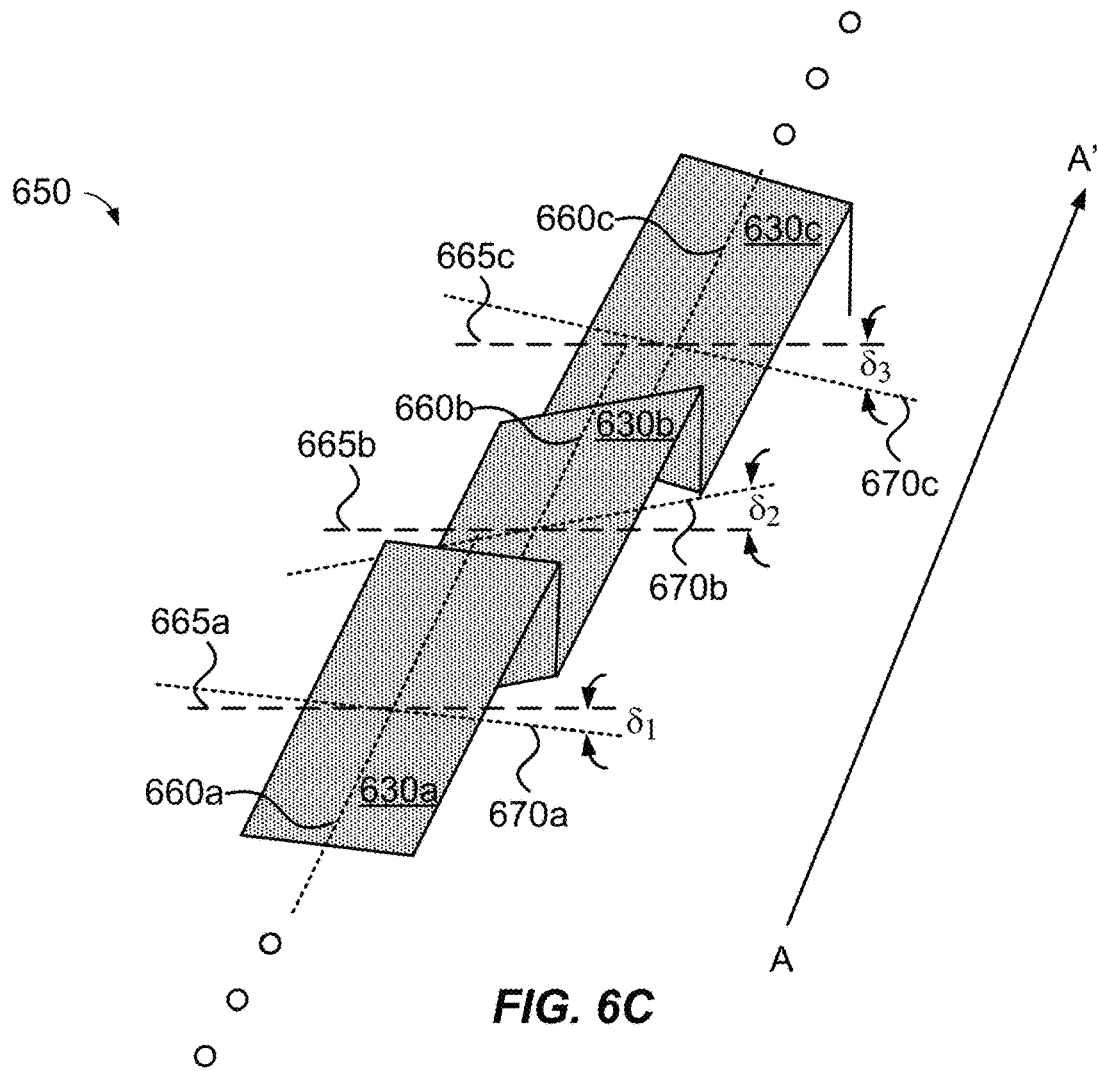

A perspective view of some of the facets 630 in the diagram 640 is shown in a diagram 650 in FIG. 6C. In this view, each of the facets 630a, 630b, and 630c is shown to have a first axis (e.g., axes 660a, 660b, and 660c) and a second axis perpendicular to the first axis (e.g., axes 665a, 665b, 665c). The facets 630a, 630b, and 630c may be aligned, ordered, or oriented along the radial direction (e.g., along A-A') and, therefore, are also aligned along their respective first axes. On the other hand, for each of the facets 630a, 630b, and 630c, it may be possible to introduce, assign, or control an angular change or offset with respect to their second axes. For example, for the facet 630a, the second axis 665a may be rotated or tilted by an angle $\delta_1$, where $0 \leq \delta_1 \leq 360°$, or $\delta_1 \leq \pm 90°$, to a different position 670a. Similarly for the facet 630b, where the second axis 665b may be rotated or tilted by an angle $\delta_2$, where $0 \leq \delta_2 \leq 360°$, or $\delta_2 \leq \pm 90°$, to a different position 670b, and for the facet 630c, where the second axis 665c may be rotated or tilted by an angle $\delta_3$, where $0 \leq \delta_3 \leq 360°$, or $\delta_3 \leq \pm 90°$, to a different position 670c. The amount of tilt or rotation (e.g., $\delta_1$, $\delta_2$, and $\delta_3$) for the second axis in each of the facets 630a, 630b, and 630c can be chosen or assigned randomly (e.g., pseudo-randomly) such that there is no pattern or relationship in the amount of tilt or rotation in adjacent or consecutive facets, or among all of the facets in the reflecting structure 615. The tilt or rotation of the second axes may result in some second axes rotating clockwise and some rotating counterclockwise. Moreover, while the amount of tilt or rotation of any one second axis is randomly assigned or selected, the overall distribution of the randomness may result in a uniform distribution across the entire set of facets in the reflecting structure 615.

Figure 6D:
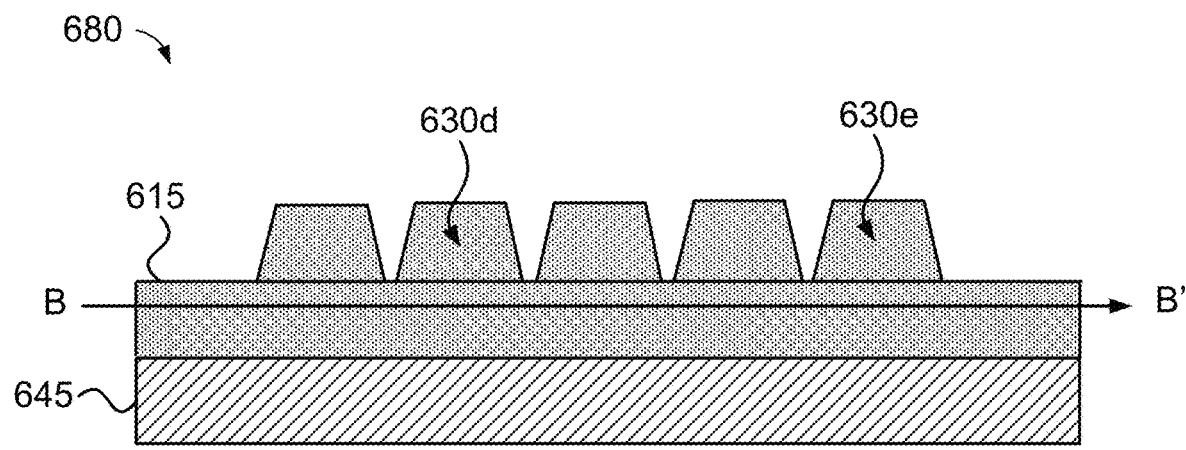
FIGS. 6D and 6E are diagrams that show an example of randomness of facets in an optically variable device along an axis in an angular direction with alignment along a perpendicular axis to produce the flat ring optical effect in accordance with aspects of the disclosure.

Returning to FIG. 6A, with respect to the portion 620, a view along B-B' perpendicular to the radial direction 625 is illustrated in a diagram 680 in FIG. 6D. In this example, five (5) facets 630 are shown for purposes of illustration. The facets 630 as illustrated are shown inclined backwards so that the top of the facets 630 appears further away that the bottom.

As with FIG. 6B, each of the facets 630 in the diagram 680 is configured or formed to have a specified angle relative to a plane or direction perpendicular to the surface of the reflecting structure 615 (not shown) which may be the same or different depending on the implementation of the reflecting structure 615.

Figure 6E:
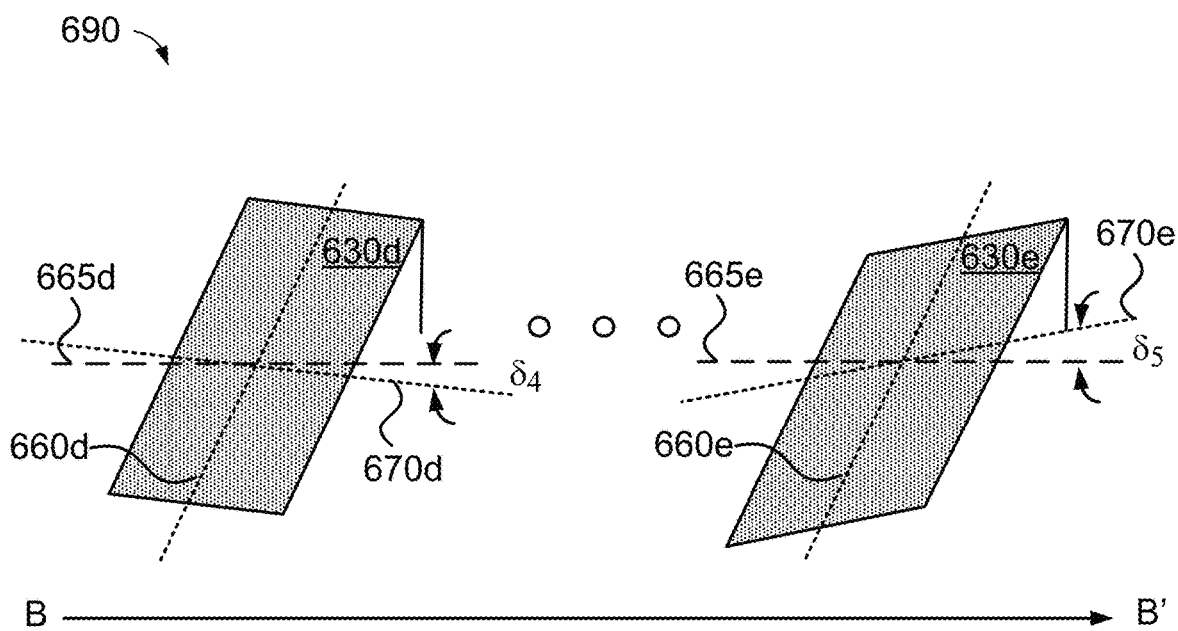

A perspective view of some of the facets 630 in the diagram 680 is shown in a diagram 690 in FIG. 6E. In this view, each of the facets 630*d* and 630*e* (which need not be adjacent to each other) is shown to have a first axis (e.g., axes 660*d* and 660*e*) and a second axis perpendicular to the first axis (e.g., axes 665*d* and 665*e*). The facets 630*d* and 630*e* may be positioned along an angular direction (e.g., along B-B') perpendicular to the radial direction 625 where their first axes are ordered or aligned in the radial direction 625. On the other hand, for each of the facets 630*d* and 630*e*, it may be possible to introduce, assign, or control an angular change or offset with respect to their second axes. For example, for the facet 630*d*, the second axis 665*d* may be rotated or tilted by an angle $\delta_4$, where $0 \leq \delta_4 \leq 360°$, or $\delta_4 \leq \pm 90°$, to a different position 670*d*. Similarly for the facet 630*e*, where the second axis 665*e* may be rotated or tilted by an angle $\delta_5$, where $0 \leq \delta_5 \leq 360°$, or $\delta_5 \leq \pm 90°$, to a different position 670*e*. The amount of tilt or rotation (e.g., $\delta_4$ and $\delta_5$) for each of the facets 630*d* and 630*e* can be chosen or assigned randomly (e.g., pseudo-randomly) such that there is no pattern or relationship in the amount of tilt or rotation in adjacent or consecutive facets.

As illustrated by FIGS. 6A-6E, one way to modify an otherwise "smooth" reflector to be able to produce the optical effects described in FIGS. 4A-4C (e.g., flat ring optical effect) is to effectively "brush" the surface of the reflector (e.g., the optically variable device 600) by introducing a random or pseudo-random variation of the second axis in each of the facets or mirrors that form the structured surface (e.g., micro mirror array) of the reflector while maintaining alignment or order in the first axis, thereby producing the single axis alignment of mirrors described above.

Figure 7:
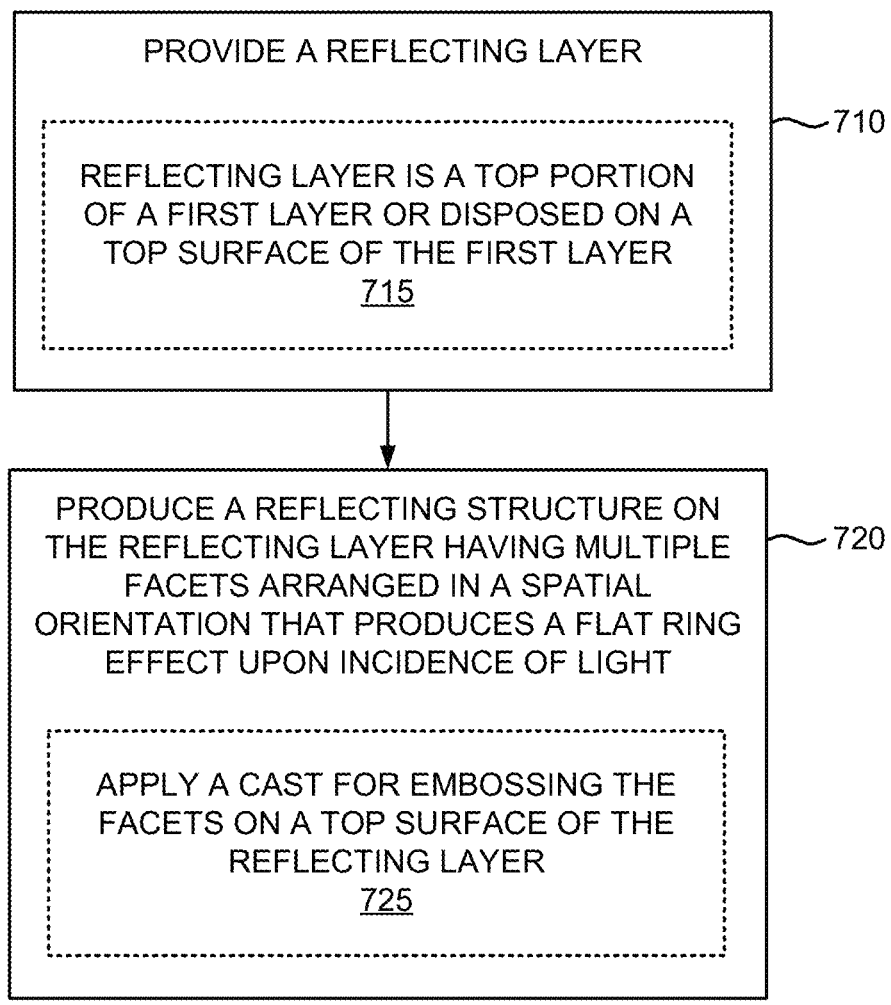
FIG. 7 is a flow diagram that shows an example of a method for making an optically variable device in accordance with aspects of this disclosure.

FIG. 7 is a flow diagram that shows an example of a method 700 for making an optically variable device or article such as the optically variable device 600 in FIG. 6A.

At block 710, the method 700 may include providing a reflecting layer. In an example, the reflecting structure 615 may be a reflecting layer or may be part of a reflecting layer.

At block 715 in block 710, the reflecting layer may be a top portion of a first layer or disposed on a top surface of the first layer. In an example, the reflecting structure 615 may be a reflecting layer and may be disposed on a first layer, which may be the layer 645 or the substrate 610. In another example, the reflecting structure 615 and the layer 645 may be made of a same material, in which case the reflecting structure 615 may be a reflecting layer and a top portion of a first layer that combines the reflecting layer and the layer 645.

At block 720, the method 700 may include producing a reflecting structure on the reflecting layer having multiple facets, the facets being arranged in a spatial orientation that produces a flat ring optical effect upon incidence of light. In an example, as shown in FIGS. 6B and 6D, the reflecting structure 615 is produced by having multiple facets 630 formed and arranged in a particular spatial orientation.

At block 725 in block 720, producing the reflecting structure on the reflecting layer may include applying a cast (see e.g., FIGS. 8A and 8B) for embossing the facets on a top surface of the reflecting layer.

In an aspect of the method 700, in the spatial orientation each facet is ordered along a first axis and tilted at pseudo-random angles about a second axis perpendicular to the first axis. As shown in the series of FIGS. 6B-6E, the facets 630*a*, 630*b*, 630*c*, 630*d*, and 630*e* are aligned or ordered along the first axes 660*a*, 660*b*, 660*c*, 660*d*, and 660*e*, and then randomly rotated or tilted about the second axes 665*a*, 665*b*, 665*c*, 665*d*, and 665*e* (e.g., rotated or tilted by pseudo-random angles $\delta_1, \delta_2, \delta_3, \delta_4$, and $\delta_5$). For each facet, the first axis may correspond to an axis along a longest dimension of the facet (e.g., the length of the facet or mirror) and the second axis corresponds to an axis along a shortest dimensions of the facet (e.g., the width of the facet or mirror). In an example, the pseudo-random angles for each facet may range from 0 to $\pm 90°$. Additionally, each facet is considered to be configured to produce a reflection from the incident light that is at least partially diffuse for the first axis and at least partially specular for the second axis.

In another aspect of the method 700, in the spatial orientation the facets are ordered along radial lines from a center of the reflecting structure. In an example, and as shown in FIGS. 6A-6E, the facets 630 are spatially oriented such that the facets are aligned or ordered along the radial direction 625.

Figure 8A:
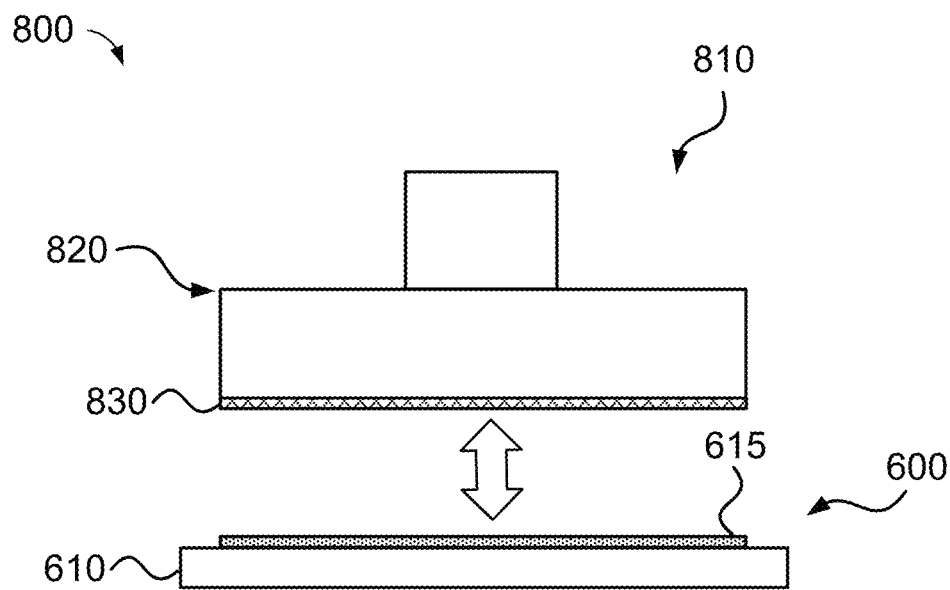
FIG. 8A is a schematic diagram that shows an example of an apparatus for making an optically variable device in accordance with aspects of this disclosure.

FIG. 8A shows a schematic diagram 800 having an example of an apparatus 810 for making an optically variable device such as the optically variable device 610 in FIG. 6. The apparatus 800 may include a pressing device 820 and a stamping device 830. The stamping device 830 may be or may include a cast or stamp with a pattern that is generated by one of several techniques, including lithography (e.g., e-beam lithography), scribing, and the like.

The stamping device 830 may be removably coupled to the pressing device 820 and configured to transfer the pattern to a reflecting material (e.g., to a reflecting layer) upon the exertion of pressure by the pressing device 820, where the pattern includes a reflecting structure (e.g., the reflecting structure 615) having multiple facets arranged in a spatial orientation that produces a flat ring optical effect upon incidence of light on the patterned reflective material. The pressing device 820 may place the stamping device 830 on the surface of the reflecting material to produce the reflecting structure 615, which may be disposed on the substrate 610 as described above. This process of pressing a pattern to produce a desired reflecting structure 615 (e.g., a desired micro mirror array with particular orientations for each of the facets or mirrors) may be also be referred to as foil stamping or foil embossing. Once the pattern is transferred from the cast to the reflecting material resulting in a patterned reflective material (e.g., the reflecting structure 615), the pressing device 820 may move the stamping device 830 away from the patterned reflective material.

Figure 8B:
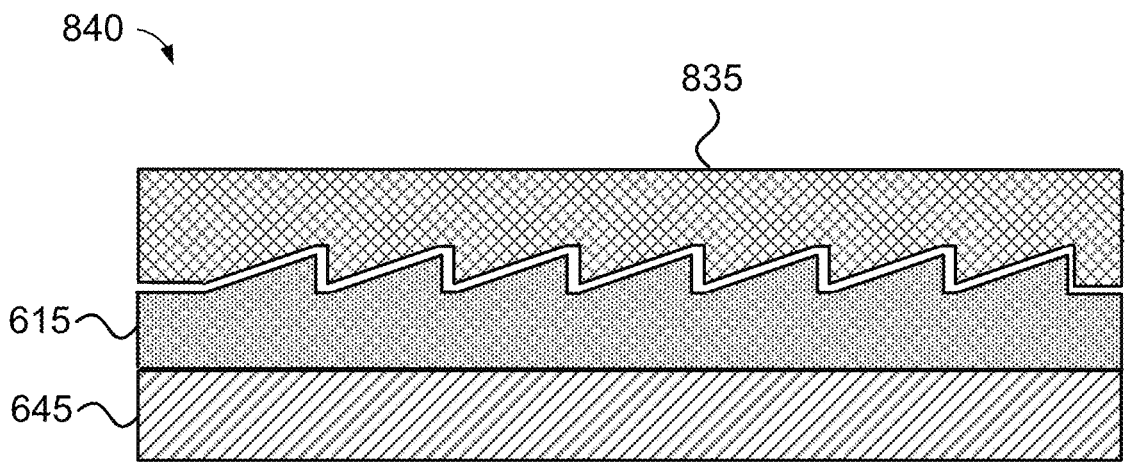
FIG. 8B is a diagram that shows an example of a cast or stamp used to transfer a pattern to make an optically variable device in accordance with aspects of this disclosure.

FIG. 8B is a diagram 840 that illustrates an example of a stamp 835 of the stamping device 830 used to transfer a pattern as part of an embossing process described above in connection with FIG. 8A and the apparatus 810, and produce the reflecting structure 615 of the optically variable device 600.

The optically variable device 600 made in accordance with the method 700 and the apparatus 810 may include a first layer (e.g., the substrate 610 and/or the layer 645), and a reflecting structure (e.g., the reflecting structure 615) disposed on the first layer, where the reflecting structure has a top surface including multiple embossed facets (e.g., the facets 630 embossed using the cast 835), and where the facets are arranged in a spatial orientation (e.g., axis orientation) that produces a flat ring optical effect upon incidence of light (see e.g., flat ring optical effects in FIGS. 4A-4C).

In an aspect of the optically variable device 600 made as described above, the in the spatial orientation each facet is ordered along a first axis and tilted at pseudo-random angles about a second axis perpendicular to the first axis. For each facet, the first axis corresponds to an axis along a longest dimension of the facet and the second axis corresponds to an axis along a shortest dimensions of the facet. The pseudo-random angles for each facet may range from 0 to ±90°.

In another aspect of the optically variable device 600 made as described above, each facet is configured to produce a reflection from the incident light that is at least partially diffuse for the first axis and at least partially specular for the second axis.

In another aspect of the optically variable device 600 made as described above, in the spatial orientation the facets are ordered along radial lines from a center of the reflecting structure. In some implementations, the facets are of the same size and/or the same shape. In other implementations, the facets vary in size and/or shape along radial lines from a center of the reflecting structure.

In another aspect of the optically variable device 600 made as described above, the reflecting structure includes a reflecting material (e.g., a metallic material) or reflecting layer and is integrated with the first layer. In some implementations, the first layer is made of one of a polymeric material, a plastic material, or a metallic material.

In another aspect of the optically variable device 600 made as described above, a top surface of at least a subset of the facets is planar or smooth.

In another aspect of the optically variable device 600 made as described above, a top surface of at least a subset of the facets includes microstructures.

Figure 9:
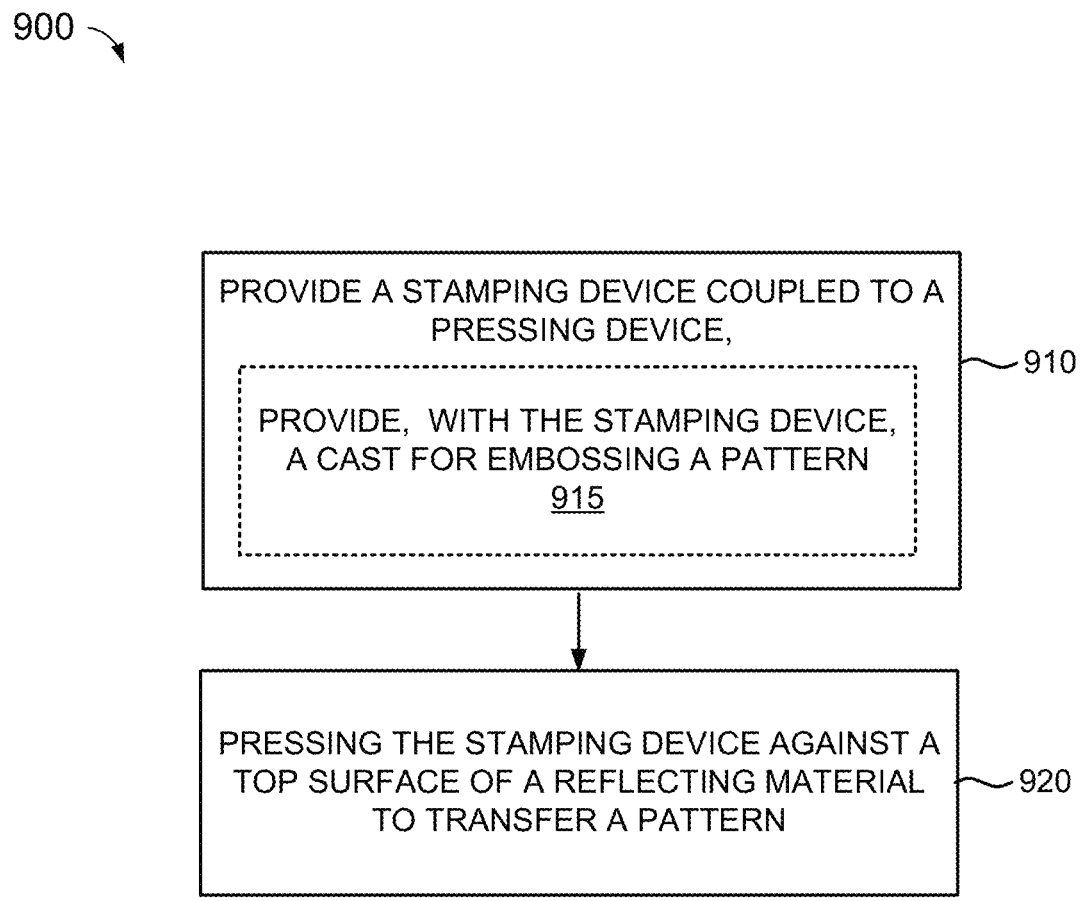
FIG. 9 is a flow diagram that shows an example of another method for making an optically variable device in accordance with aspects of this disclosure.

FIG. 9 shows a flow diagram that illustrates an example of a method 900 for making an optically variable device or article such as the optically variable device 600 in FIG. 6A using the apparatus 810 in FIG. 8A.

At block 910, the method 900 includes providing a stamping device (e.g., the stamping device 830) coupled to a pressing device (e.g., the pressing device 820) is provided.

At block 915 in the block 910, a cast (e.g., the cast 835) for embossing a pattern is provided as part of the stamping device.

At block 920, the method 900 includes pressing the stamping device against a top surface of a reflecting material to transfer the pattern. In an example, and as described above in connection with FIGS. 8A and 8B, the stamping device 830 with the cast 835 is pressed against a reflecting layer from which the reflecting structure 615 is formed by embossing the facets 630 using the pattern in the cast 835.

The concepts and techniques described in this disclosure address provide a solution that enables yet another way to produce the unique optical effects described in this disclosure by controlling the direction, orientation, or rotation of each individual mirror or facet in a micro mirror array to emulate or even surpass the optical effects that can be achieved using magnetically-oriented flakes.

It is understood that the specific order or hierarchy of blocks in the methods/flow charts disclosed is an illustration of exemplary approaches. Based upon design preferences, it is understood that the specific order or hierarchy of blocks in the methods/flow charts can be rearranged. Further, some blocks may be combined or omitted (e.g., optional). The accompanying method claims present elements of the various blocks in a sample order, and are not meant to be limited to the specific order or hierarchy presented.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

It should be appreciated to those of ordinary skill that various aspects or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

What is claimed is:

1. An optically variable device, comprising:
a first layer; and
a reflecting structure disposed on the first layer,
   the reflecting structure having a top surface including multiple embossed facets,
   the facets being arranged in a spatial orientation that produces a flat ring optical effect upon incidence of light,
   a facet, of the facets, being ordered along a first axis and tilted about a second axis perpendicular to the first axis, and
   the facet being configured to produce a reflection from the incidence of light that is one or more of:
   at least partially diffuse for the first axis, or
   at least partially specular for the second axis.

2. The optically variable device of claim 1, wherein in the spatial orientation each facet is ordered along the first axis and tilted at pseudo-random angles about the second axis.

3. The optically variable device of claim 1, wherein, for the facet, the first axis corresponds to an axis along a longest dimension of the facet and the second axis corresponds to an axis along a shortest dimensions of the facet.

4. The optically variable device of claim 2, wherein the pseudo-random angles for each facet range from O to ±90°.

5. The optically variable device of claim 1, wherein the facet is configured to produce the reflection from the incidence of light that is at least partially diffuse for the first axis and at least partially specular for the second axis.

6. The optically variable device of claim 1, wherein in the spatial orientation the facets are ordered along radial lines from a center of the reflecting structure.

7. The optically variable device of claim 1, wherein the facets are of the same size.

8. The optically variable device of claim 1, wherein the facets vary in size along radial lines from a center of the reflecting structure.

9. The optically variable device of claim 1, wherein the reflecting structure includes a reflecting material and is integrated with the first layer.

10. The optically variable device of claim 1, wherein the first layer is made of one of a polymeric material, a plastic material, or a metallic material.

11. The optically variable device of claim 1, wherein a top surface of at least a subset of the facets is planar.

12. The optically variable device of claim 1, wherein a top surface of at least a subset of the facets includes microstructures.

13. The optically variable device of claim 1, wherein the reflecting structure with the facets corresponds to a micro-mirror array.

14. The optically variable device of claim 1, wherein, in the spatial orientation, the facets are configured to emulate an outside surface of a reflecting half sphere.

15. A method for making an optically variable device, comprising:
  providing a reflecting layer; and
  producing a reflecting structure on the reflecting layer having multiple facets,
    the facets being arranged in a spatial orientation that produces a flat ring optical effect upon incidence of light,
    a facet, of the facets, being ordered along a first axis and tilted about a second axis perpendicular to the first axis, and
    the facet being configured to produce a reflection from the incidence of light that is one or more of:
      at least partially diffuse for the first axis, or
      at least partially specular for the second axis.

16. The method of claim 15, wherein providing the reflecting layer includes providing the reflecting layer that is a top portion of a first layer or that is disposed on a top surface of the first layer.

17. The method of claim 15, wherein producing the reflecting structure on the reflecting layer includes applying a cast for embossing the facets on a top surface of the reflecting layer.

18. The method of claim 15, wherein in the spatial orientation each facet is ordered along the first axis and tilted at pseudo-random angles about the second axis.

19. The method of claim 15, wherein, for the facet, the first axis corresponds to an axis along a longest dimension of the facet and the second axis corresponds to an axis along a shortest dimensions of the facet.

20. The method of claim 18, wherein the pseudo-random angles for each facet range from O to ±90°.

21. The method of claim 18, wherein the facet is configured to produce the reflection from the incidence of light that is at least partially diffuse for the first axis and at least partially specular for the second axis.

22. The method of claim 15, wherein in the spatial orientation the facets are ordered along radial lines from a center of the reflecting structure.

23. An apparatus for making an optically variable device, comprising:
  a pressing device; and
  a stamping device coupled to the pressing device and configured to transfer a pattern to a reflecting material upon an exertion of pressure by the pressing device,
    the pattern including a reflecting structure having multiple facets arranged in a spatial orientation that produces a flat ring optical effect upon incidence of light on the patterned reflective material.

24. The apparatus of claim 23, wherein in the spatial orientation each facet is ordered along a first axis and tilted at pseudo-random angles about a second axis perpendicular to the first axis.

25. The apparatus of claim 24, wherein, for each facet, the first axis corresponds to an axis along a longest dimension of the facet and the second axis corresponds to an axis along a shortest dimensions of the facet.

26. The apparatus of claim 24, wherein the pseudo-random angles for each facet range from O to ±90°.

* * * * *